(No Model.)
W. W. LEE.
LAWN SPRINKLER.
No. 384,699. Patented June 19, 1888.
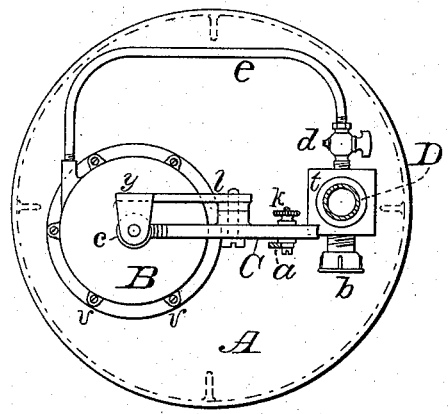
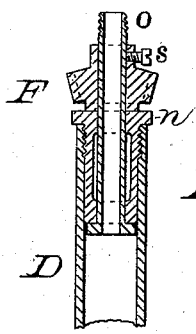
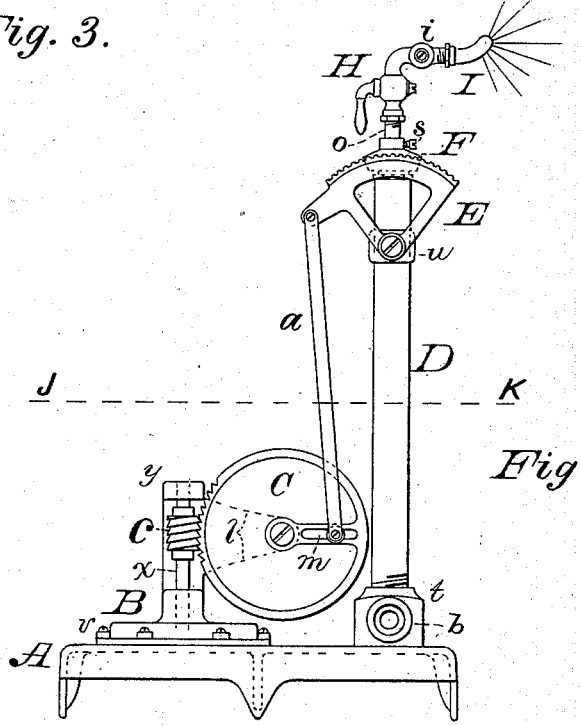
WITNESSES:
INVENTOR:
William Wilson Lee

UNITED STATES PATENT OFFICE.

WILLIAM W. LEE, OF NORTHAMPTON, MASSACHUSETTS.

LAWN-SPRINKLER.

SPECIFICATION forming part of Letters Patent No. 384,699, dated June 19, 1888.

Application filed April 1, 1887. Serial No. 233,250. (No model.)

*To all whom it may concern:*

Be it know that I, WILLIAM WILSON LEE, of Northampton, in the county of Hampshire and State of Massachusetts, have invented a new and useful Lawn-Sprinkler, of which the following is a specification, reference being had to the accompanying drawings, forming a part hereof, in which—

Figure 1 is a side elevation of a device embodying my invention. Fig. 2 is a sectional plan, the section being on line J K, Fig. 1. Fig. 3 is a detail.

My invention is a device for scattering water or sprinkling lawns, the essential feature of which is a swivel-joint and pipe with a union-joint at the upper end of a vertical pipe supplied with water under pressure. The swivel-joint and pipe are given a rotary motion by means of a small gear engaging with a segment of a gear. Power is applied to the segment by connection with the shaft of a small water-motor. This water-motor is driven by a small stream of water taken from the main pipe or other convenient source, and the speed is controlled by a cock. By a simple and well-known method one end of the rod connecting the segment with the water-motor may be adjusted to give a greater or less travel to the segment, thereby causing the bevel-gear to turn the swivel-joint and pipe more or less.

In the drawings, A is the base or frame of the sprinkler; D, a pipe to which the hose through which the water is supplied is connected at *b*. This pipe D is shown as connected to base A by means of a projection, *t*, cast with frame A. In the upper end of pipe D a pipe, *o*, is secured by sleeve *n*, as shown clearly in Fig. 3, and to this pipe the gear F is made fast by set-screw *s*. The nozzle I is so connected at *i* to pipe *o* that the nozzle can be adjusted to discharge at any angle.

H is a coupling to connect nozzle I to pipe *o*. The nozzle I is indicated as discharging the water after the manner of a rose-nozzle; but, as will be clear, other forms may be used.

A segment-gear, E, is mounted upon a stud on sleeve *u*, fast to pipe D, and engages with gear F. The connecting-rod *a* is pinned at one end to an arm on gear E, and at its other end to a wrist-pin adjustable in slot *m* of wheel C by screw *k*, in a manner too well known to need further description. The wheel C is mounted in a bracket, *l*, fast to a post, *y*, which rises from the casing of the water-motor B. The shaft *x* of motor B carries worm *c*, which meshes with the teeth in wheel C. The water-motor B is best supplied by a pipe leading from D, as indicated by *e*, Fig. 2, with a cock, *d*, to regulate the supply of water to the motor.

The operation is as follows: Water flows through the hose and fills pipes D and *o*, and escapes in jets or otherwise, as desired, through nozzle I; but water also flows through pipe *e* and causes the wheel of motor B to rotate, and as shaft *x* is fast to the wheel of the motor the wheel C is also caused to rotate and gear E to oscillate. Gear E being in mesh with gear F rotates pipe *o* and nozzle I on the axis of pipe *o*, whereby the water escaping from nozzle I is scattered as desired. By adjusting the wrist-pin of rod *a* in slot *m* the extent of motion of gear E can be regulated, and thereby the amount of rotary motion of pipe *o*.

I am aware of Brusie's patent, No. 137,175, dated March 25, 1873; Flad's patent, No. 288,222, dated November 13, 1883; and Worthington's patent, No. 302,309, dated July 22, 1884, and disclaim all that is shown in them.

What I claim as my invention is—

In combination, base A, vertical pipe D, water-motor B, swiveling-pipe *o*, elbow H, nozzle I, and mechanism C *a* E F, connecting water-motor B with pipe *o*, the axis of pipe *o* being the continuation of that of vertical pipe D, all substantially as and for the purpose set forth.

WILLIAM W. LEE.

In presence of—
W. B. PARKER,
C. H. PIERCE.